US006777638B2

(12) United States Patent
Nemchinsky

(10) Patent No.: US 6,777,638 B2
(45) Date of Patent: Aug. 17, 2004

(54) PLASMA ARC TORCH AND METHOD OF OPERATION FOR REDUCED EROSION OF ELECTRODE AND NOZZLE

(75) Inventor: Valerian Nemchinsky, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 10/294,968

(22) Filed: Nov. 14, 2002

(65) Prior Publication Data

US 2004/0094520 A1 May 20, 2004

(51) Int. Cl.$^{7}$ .................................................. B23K 10/00

(52) U.S. Cl. .............................. 219/121.57; 219/130.4; 219/121.54; 219/121.55

(58) Field of Search ........................ 219/121.57, 121.54, 219/121.55, 121.59, 75, 121.51, 130.4, 137 PS, 121.43, 74, 121.39, 121.44, 121.46

(56) References Cited

U.S. PATENT DOCUMENTS

| | | | | |
|---|---|---|---|---|
| 3,988,566 A | * 10/1976 | Vogts et al. | ........... | 219/121.47 |
| 4,023,006 A | 5/1977 | West et al. | | |
| 5,017,752 A | 5/1991 | Severance, Jr. et al. | | |
| 5,023,425 A | 6/1991 | Severance, Jr. | | |
| 5,166,494 A | 11/1992 | Luo et al. | | |
| 5,290,995 A | 3/1994 | Higgins et al. | | |
| 5,424,507 A | 6/1995 | Yamaguchi | | |
| 5,614,110 A | 3/1997 | Shintani et al. | | |
| 5,620,617 A | 4/1997 | Borowy et al. | | |
| 5,844,197 A | 12/1998 | Daniel | | |
| 6,054,669 A | 4/2000 | Warren, Jr. | | |
| 6,232,574 B1 | * 5/2001 | Oakley | .................. | 219/121.51 |
| 6,248,972 B1 | * 6/2001 | Yamaguchi | ............ | 219/121.39 |
| 6,313,429 B1 | 11/2001 | Lampson et al. | | |
| 6,326,583 B1 | 12/2001 | Hardwick et al. | | |
| 6,335,505 B2 | 1/2002 | Billerot | | |
| 6,369,350 B1 | 4/2002 | Norris | | |
| 6,498,317 B2 | 12/2002 | Hardwick | | |
| 2001/0025834 A1 | 10/2001 | Billerot | | |

* cited by examiner

*Primary Examiner*—Mark Paschall
(74) *Attorney, Agent, or Firm*—Alston & Bird LLP

(57) ABSTRACT

There are provided a plasma arc torch and associated methods for selectively switching between a working mode and a standby mode. An electric arc is established between an electrode and a workpiece, and the torch is operated selectively in the working and standby modes. In the working mode, the arc extends between the electrode and the workpiece, the arc has a working arc current, and a plasma gas flows through a nozzle at a working flow rate. In the subsequent standby mode, the arc extends between the electrode and the nozzle and has a current less than the working arc current. The gas flow rate in the standby mode can be reduced to less than the working flow rate, and the plasma gas can be switched from an oxidizing gas to a non-oxidizing gas.

22 Claims, 4 Drawing Sheets

PLASMA ARC TORCH AND METHOD OF OPERATION FOR REDUCED EROSION OF ELECTRODE AND NOZZLE

BACKGROUND OF THE INVENTION

1) Field of the Invention

The invention relates to a plasma arc torch and method for switching between a working mode and a standby mode and, more specifically, a standby mode characterized by an arc extending between an electrode and a nozzle, a reduced arc current, a standby gas, and/or a reduced gas flow rate.

2) Description of Related Art

Plasma arc devices are commonly used for cutting and welding. One conventional plasma arc torch includes an electrode positioned within a nozzle. A pressurized gas is supplied to the torch and flows between the electrode and the nozzle, and an arc is established between the electrode and a workpiece. The arc ionizes the gas, and the resulting high temperature gas can be used for cutting or welding operations.

Erosion reduces the useful life of the electrode and is known to occur during transfer or operation of the torch (operation erosion) and during starting and stopping of the arc (start erosion). One typical method for starting the torch is to first initiate a pilot mode by establishing an arc at a low current between the electrode and the nozzle. The torch is then switched from the pilot mode to a transfer or working mode by transferring the arc to the workpiece so that the arc extends between the electrode and the workpiece, and increasing the current of the arc. A non-oxidizing gas can be supplied to the torch during the pilot mode to reduce the oxidation and erosion of the electrode, and an oxidizing gas can be supplied thereafter during operation. The use of a pilot mode is further described in U.S. Pat. No. 5,017,752, titled "Plasma arc torch starting process having separated generated flows of non-oxidizing and oxidizing gas," assigned to the assignee of the present invention and the entirety of which is incorporated herein by reference.

Although the erosion of the electrode can be reduced by supplying the non-oxidizing gas to the torch during the pilot mode, the starting and stopping of the torch are still erosive to the electrode. Start erosion can constitute a significant source of total erosion of the electrode, for example, when a cutting torch is turned on and off repeatedly to cut a number of different workpieces or to make a number of discontinuous cuts in a single workpiece. One proposed method of reducing the start erosion attributable to such repeated starts is to maintain the arc between successive cuts instead of stopping and restarting the arc between each cut. The arc can be maintained by switching the arc from the workpiece to the nozzle or a special electrode so that the arc extends between the electrode and the nozzle or the special electrode. The start erosion of the electrode can be reduced using such a continuous arc, but the arc causes erosion of the nozzle or special electrode, especially if maintained for lengthy durations. Additionally, the provision of the special electrode on the torch increases the cost and complexity of the torch.

Thus, there is a need for an improved apparatus and method for reducing the erosive effects of the arc on both the electrode and nozzle. The apparatus should be capable of performing a number of discontinuous welding or cutting operations and maintaining a continuous arc between successive operations. Preferably, the apparatus should not require a special electrode for maintaining a continuous arc between cutting or welding operations.

BRIEF SUMMARY OF THE INVENTION

The present invention provides a plasma arc torch and an associated method for switching between a working mode and a standby mode, which can be employed between successive welding or cutting operations. In the standby mode, the arc is switched to extend between the electrode and the nozzle. Additionally, the arc current is reduced and at least one flow parameter of the plasma gas is adjusted, for example, by changing the plasma gas composition and/or reducing the gas flow rate. Thus, the arc can be maintained while the torch is used for discontinuous operations, and the erosive effects on both the nozzle and the electrode are minimized.

In one embodiment, the present invention provides a method of operating a plasma arc torch selectively in a working mode and a standby mode. An electric arc is established between the electrode and a workpiece, for example, by initiating a pilot arc between the electrode and the nozzle with a current less than a subsequent working current, initiating the flow of plasma gas around the electrode and through the nozzle at a pilot flow rate less than a subsequent working flow rate, and then transferring the pilot arc from the nozzle to the workpiece. The torch is operated in the working mode at a relatively high arc current, such as at least about 250 amps, and the plasma gas is supplied at a relatively high flow rate, such as at least about 2 cubic feet per minute (CFM). When the working mode is to be terminated, instead of shutting off the torch, the torch is switched to the standby mode, in which the arc current is less than the working current, such as less than about 25 amps. The standby gas is supplied to the torch during the standby mode at a standby flow rate, which can be less than the working flow rate, such as less than about 1 CFM and preferably between about 0.25 and 0.60 CFM. As a result, the arc is switched from the workpiece to the nozzle. In making the switch from the working to the standby mode, the plasma gas can be switched from an oxidizing gas, such as oxygen, used during the working mode to a non-oxidizing gas, such as nitrogen or argon, used during the standby mode. The working mode can then be resumed without having to re-start the torch.

The present invention also provides a plasma arc torch configured for selective operation in a working mode and a standby mode. The torch includes a nozzle assembly defining a bore and an electrode electrically insulated from the nozzle assembly and directed toward the bore such that the electrode can be directed toward a workpiece. A working arc power source is in electrical communication with the electrode and the workpiece and configured to supply a working arc current therebetween. A standby arc power source is in electrical communication with the electrode and the nozzle assembly and configured to supply a standby arc current therebetween. The power sources are controlled by a power controller. First and second gas sources are fluidly connected to the bore, and a gas controller is configured to control the flow of gas from the gas sources. The power controller and the gas controller are configured to switch selectively between a working mode and a standby mode. The working mode is characterized by an arc extending between the electrode and the workpiece, the arc having a working current, and a plasma gas flowing through the nozzle at a working flow rate. The standby mode is characterized by the arc extending between the electrode and the nozzle, the arc having a standby current less than the working current, and the standby gas flowing through the nozzle at a standby flow rate that can be less than the working flow rate. The working and standby arc power sources can be configured to supply currents of at least about 250 amps and less than about 25 amps, respectively. The first and second gas sources can be configured to supply a non-oxidizing gas and an oxidizing gas, respectively, each controlled by the gas controller. Further, the gas controller can be configured to variably regulate the flow rates of the gases.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
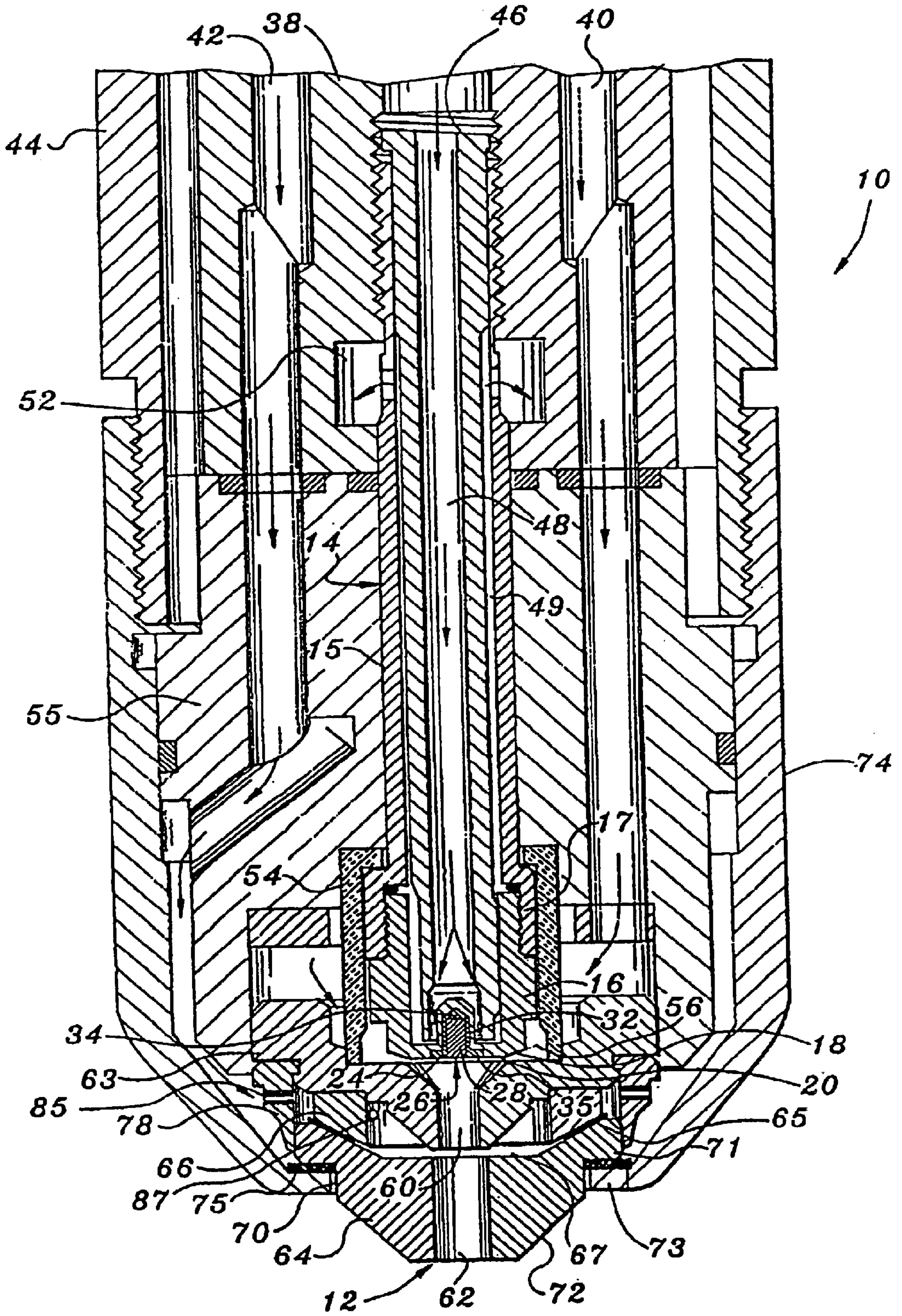
FIG. 1 is a section view of a plasma arc torch according to one embodiment of the present invention.

Referring now to the drawings, and more particularly to FIG. 1, there is illustrated a plasma arc torch 10 according to one embodiment of the present invention. The plasma arc torch 10 includes a nozzle assembly 12 and a tubular electrode 14. The electrode 14 is preferably made of copper or a copper alloy, and is composed of an upper tubular member 15 and a lower, cup-shaped member or holder 16. More particularly, the upper tubular member 15 is of elongate open tubular construction and it defines the longitudinal axis of the torch. The member 15 also includes an internally threaded lower end portion 17. The holder 16 is also of tubular construction, and it includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

A cavity 24 is formed in the front face 20 of the end wall 18 and extends rearwardly along the longitudinal axis. An insert assembly 26 is mounted in the cavity and comprises an emissive insert 28, which is disposed coaxially along the longitudinal axis. The emissive insert 28 shown in FIG. 1 is generally cylindrical, though other shapes can similarly be used. Preferably, the emissive insert 28 is composed of a metallic material which has a relatively low work function so that the insert 28 is adapted to readily emit electrons upon an electrical potential being applied thereto. Suitable examples of such materials include hafnium, zirconium, tungsten, and alloys thereof.

A relatively non-emissive separator 32 is positioned in the cavity 24 coaxially about the emissive insert 28 with the separator 32 having a peripheral wall and a closed bottom wall 34, which are metallurgically bonded to the walls of the cavity 24. Further, the separator 32 includes an annular flange 35, which defines an outer annular surface that lies in the plane of the front face 20 of the holder 16. The separator 32 is further described in U.S. Pat. No. 5,023,425, titled "Electrode for plasma arc torch and method of fabricating same," the entirety of which is herein incorporated by reference.

In the illustrated embodiment, the electrode 14 is mounted in a plasma arc torch body 38, which has gas and liquid passageways 40, 42 respectively. The torch body 38 is surrounded by an outer insulated housing member 44. A tube 46 is suspended within a central bore 48 of the electrode 14 for circulating a liquid medium such as water through the electrode structure 14. The tube 46 is of a diameter smaller than the diameter of the bore 48 so as to provide a space 49 for the water to flow upon discharge from the tube 46. The water flows from a source (not shown) through the tube 46 and back through the space 49 to an opening 52 in the torch body 38 and to a drain hose (not shown).

Figure 2:
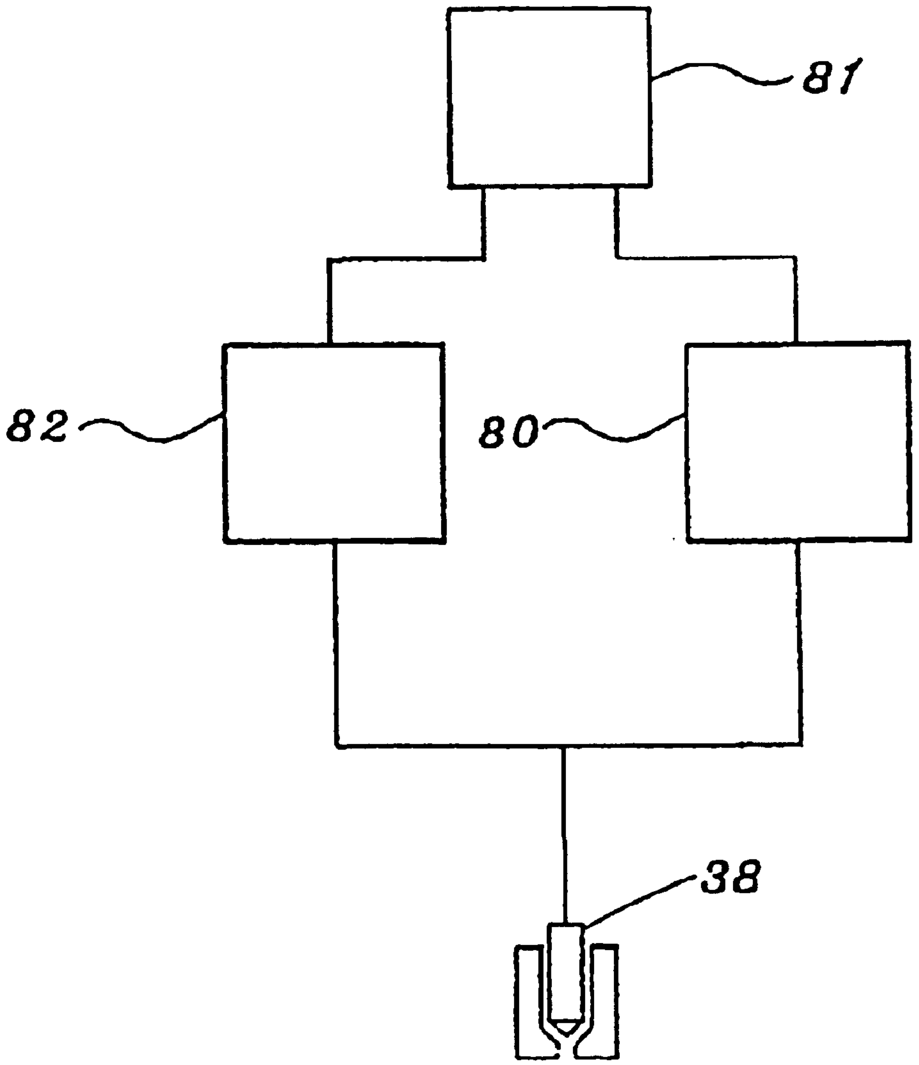
FIG. 2 is schematic diagram of the plasma arc torch according to one embodiment of the present invention illustrating the plasma gas sources.

The passageway 42 directs the injection water into the nozzle assembly 12 where it is converted into a swirling vortex for surrounding the plasma arc. As illustrated in FIG. 2, the gas passageway 40 of the torch body 38 is configured to receive gas from one or more suitable sources. For example, a first source 80 can supply a non-oxidizing gas, i.e., a non-reactive gas, such as nitrogen, argon, or mixtures thereof. A second source 82 can supply an oxidizing gas, i.e., a reactive gas, such as oxygen or air. A gas controller 81 selectively controls the respective flows of non-oxidizing and oxidizing gases from the sources 80, 82 into the passageway 40. The gas controller 81 can include one or more manually adjustable valves that are accessible to the operator, or the controller 81 can be an automated device, such as an automated valve controlled by an electronic control circuit. Preferably, the gas controller 81 can regulate a variable flow rate of the gases from each of the sources 80, 82. The passageway 40 directs the gas through a conventional gas baffle 54 of any suitable high temperature ceramic material into a gas plenum chamber 56 in a swirling fashion as is well-known. The gas flows out from the plenum chamber 56 through arc-constricting coaxial bores 60, 62 of the nozzle assembly 12. The electrode 14 holds in place the ceramic gas baffle 54 and a high temperature plastic insulating member 55. The member 55 electrically insulates the nozzle assembly 12 from the electrode 14.

The nozzle assembly 12 comprises a first nozzle member 63 and a second nozzle member 64, with the members 63, 64 including the first and second bores 60, 62, respectively. Although the first and second nozzle members 63, 64 may both be metal, a ceramic material such as alumina is preferred for the second nozzle member. The second nozzle member 64 is separated from the first nozzle member 63 by a spacer element 65, which can be formed of plastic, and a water swirl ring 66. The space provided between the first nozzle member 63 and the second nozzle member 64 forms a water chamber 67. The bore 60 of the first nozzle member 63 is in axial alignment with the longitudinal axis of the torch electrode 14. Also, the first bore 60 is cylindrical, and it has a chamfered upper end adjacent the plenum chamber 56, with a chamfer angle of about 45°.

The second nozzle member 64 comprises a cylindrical body portion 70, which defines a forward (or lower) end portion and a rearward (or upper) end portion, and with the second bore 62 extending coaxially through the body portion 70. An annular mounting flange 71 is positioned on the rearward end portion, and a frusto-conical surface 72 is formed on the exterior of the forward end portion so as to be coaxial with the second bore 62. The annular flange 71 is supported from below by an inwardly directed flange 73 at the lower end of a cup 74, with the cup 74 being detachably mounted by interconnecting threads to the outer housing member 44. Also, a gasket 75 is disposed between the two flanges 71 and 73.

The arc-constricting second bore 62 in the second nozzle member 64 is cylindrical and is maintained in axial alignment with the arc-constricting first bore 60 in the first member 63 by a centering sleeve 78, which can be formed of any suitable material such as plastic. The centering sleeve 78 has a lip at the upper end thereof, which is detachably locked into an annular notch in the first nozzle member 63. The centering sleeve 78 extends from the first nozzle member 63 in biased engagement against the second member 64. The swirl ring 66 and spacer element 65 are assembled prior to insertion of the second member 64 into the sleeve 78. The water flows from the passageway 42 through openings 85 in the sleeve 78 to the injection ports 87 of the swirl ring 66, which inject the water into the water chamber 67. Preferably, the injection ports 87 are tangentially disposed around the swirl ring 66, to cause the water to form a vortical pattern in the water chamber 67. The water exits the water chamber 67 through the arc-constricting bore 62 in the second nozzle member 64.

Figure 3:
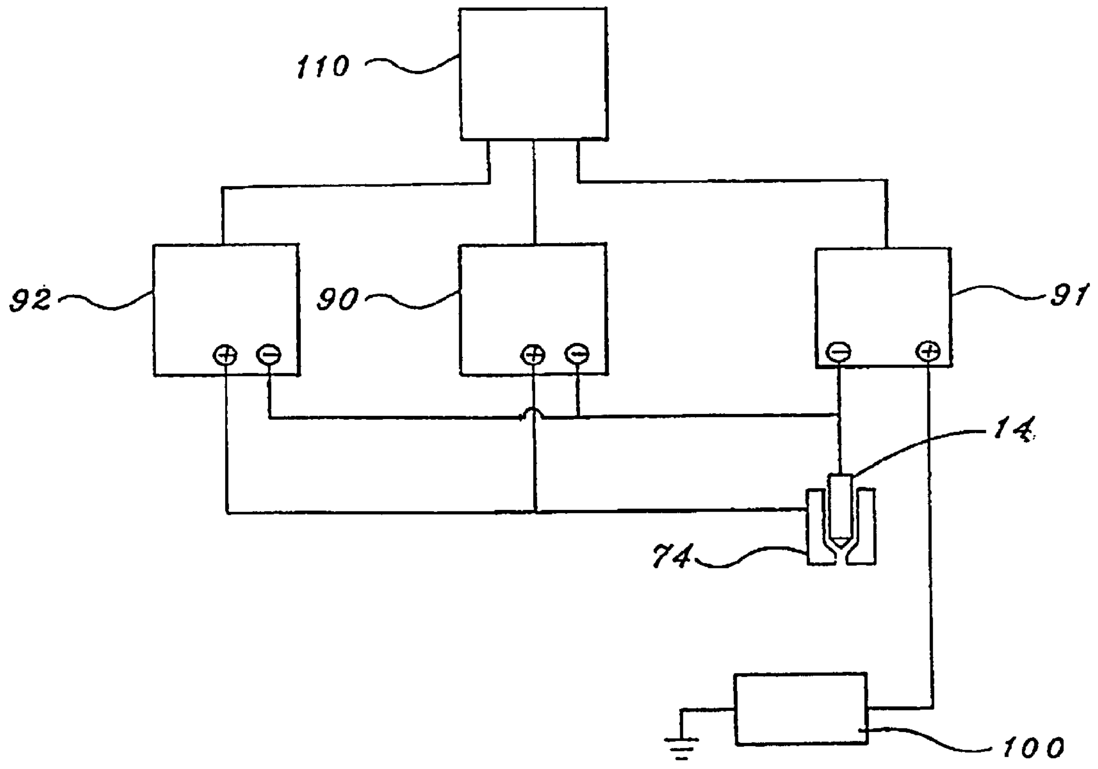
FIG. 3 is schematic diagram of the plasma arc torch according to one embodiment of the present invention illustrating the arc current power sources.

As shown schematically in FIG. 3, a pilot arc power source 90 and a standby arc power source 92 are connected to the torch 10, each separately configured in a series relationship with the electrode 14 and the torch body 38, e.g., the cup 74 which is in electrical communication with the nozzle assembly 12. A main power source 91 is connected to the torch electrode 14 in a series circuit relationship with a metal workpiece 100 that is typically grounded. A power controller 110 can control the power sources 90, 91, 92 and, hence, the pilot arc, the working arc, and the standby arc. The controller 110 can be a toggle switch positioned on the torch 10 at a convenient location suitable for an operator's use. Alternatively, the controller 110 can be an automated switching device, such as a control circuit. Each of the power sources 90, 91, 92 can be variable such that different pilot, working, and standby arc currents can be provided. Additionally, while the power sources 90, 91, 92 are shown as separate components, a single combined power source (not shown) can provide one or more of the pilot, working, and standby arc currents. A power supply can be electrically connected to the one or more power sources to provide electrical energy thereto.

Figure 4:
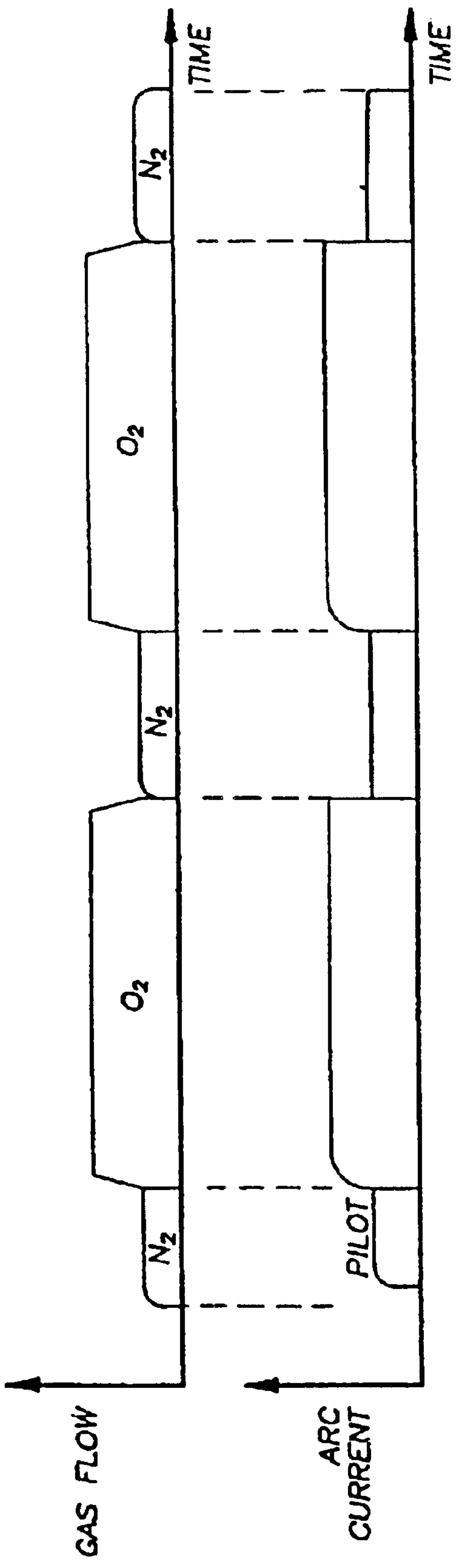
FIG. 4 is a two-part graph illustrating the arc current, gas type, and gas flow rate as functions of time during operation of a plasma arc torch according to one embodiment of the present invention.

FIG. 4 illustrates a variation in arc current, gas type, and gas flow according to one method of operation. As shown, the plasma arc torch 10 can be started in the pilot mode by initiating a flow of a start gas, which is preferably a non-oxidizing gas such as nitrogen or argon, to the gas passageway 40 and through the conventional gas baffle 54. For example, the gas controller 81 can adjust the first source 80 to an on position to begin the flow of the non-oxidizing start gas. The start gas enters the plenum chamber 56 in a swirling fashion and flows outwardly therefrom through the arc-constricting coaxial bores 60, 62 of the nozzle assembly 12. As shown in FIG. 4, a pilot arc is then ignited between the discharge end of the electrode 14 and the nozzle assembly 12. For example, the power controller 110 can energize the pilot arc power source 90 to establish an electromotive potential between the electrode 14 and the nozzle assembly 12 and thereby ignite the pilot arc.

The torch 10 is then switched from the pilot mode to the working mode, in which the torch 10 is used for operations such as cutting or welding. The pilot arc is transferred from the nozzle assembly 12 to the workpiece 100 to form the working arc extending from the electrode 14 through the arc-constricting bores 60, 62 to the workpiece 100. Preferably, the current of the working arc is higher than the pilot arc and is selected according to the torch operation. For example, the working arc current can be about 400 amps, and is preferably above about 250 amps. The higher working arc current can be supplied by the working arc power source 91, which is controlled to be energized by the power controller 110. For example, the power controller 110 can energize the working arc power source 91 and simultaneously de-energize the pilot arc power source 90.

At approximately the same time that the pilot arc is transferred, the flow of the start gas can be substantially concurrently terminated and a new flow of a plasma gas can be directed into the passageway 40, through the gas baffle 54, into the gas plenum chamber 56, and through the arc-constricting coaxial bores 60, 62 of the nozzle assembly 12. For example, the gas controller 81 can adjust the first source 80 to an off position to stop the flow of the non-oxidizing gas and turn the second source 82 to an on position to begin the flow of the oxidizing gas. Alternatively, the flow of the start gas can be continued as the plasma gas during the working mode. The plasma gas is preferably an oxidizing gas such as oxygen or air, but non-oxidizing gases can also be used as desired. The transferred or working arc and the plasma gas create a plasma arc from the electrode 14, through the nozzle assembly 12, and to the workpiece 100. Each arc-constricting bore 60, 62 contributes to the intensification and collimation of the arc. Water discharged into the passageway 42 directs the injection of water into the nozzle assembly 12 where the water is converted into a swirling vortex for surrounding the plasma arc.

Upon completion of one of a plurality of successive operations, e.g., when a particular cut or weld has been completed, the torch 10 is switched to the standby mode by transferring the working arc from the workpiece 100 and establishing a standby arc that extends from the electrode 14 to the nozzle assembly 12. For example, the power controller 110 can switch the arc by energizing the standby arc power source 92 and de-energizing the working arc power source 91. Preferably, the current of the standby arc is less than the working arc current, for example, between about 10 and 25 amps. At approximately the same time that the working arc is transferred, at least one flow parameter of the plasma gas is adjusted, such as the type or flow rate of the plasma gas. Preferably, the plasma gas is substantially concurrently terminated and a new flow of a standby gas is directed into the passageway 40, through the gas baffle 54, into the gas plenum chamber 56, and through the arc-constricting coaxial bores 60, 62 of the nozzle assembly 12. The standby gas is preferably a non-oxidizing gas such as nitrogen or argon and can be the same gas as the start gas. For example, the gas controller 81 can adjust the second source 82 to an off position to stop the flow of the oxidizing gas and turn the first source 80 to an on position to begin the flow of the non-oxidizing gas as the standby gas. Alternatively, the standby gas can be the same gas as the plasma gas or a different oxidizing gas and can be supplied by the second source 82 or a third gas source (not shown). The standby gas can also comprise a mixture of gases including, for example, a mixture of argon and oxygen. A mixed gas can be supplied from one of the sources 80, 82, a third source, or by simultaneously supplying gases from two or more of the sources 80, 82. The flow rate of the standby gas in the standby mode can be less than the flow rate of the plasma gas in the working mode. For example, the standby gas can be delivered to the torch 10 at a flow rate of between about 0.25 and 0.60 CFM, and less than about 1 CFM. Thus, the standby mode can be characterized by changes in the arc current, the gas type, and/or the gas flow rate.

The torch 10 can be maintained in the standby mode for short or long durations of time without significant erosion of the electrode 14 or the nozzle assembly 12. Thus, the torch 10 can be used to perform a first operation, and then switched to the standby mode until a subsequent operation is to be performed. For example, the torch 10 can be used to cut the workpiece 100 and then switched to the standby mode while the workpiece 100, or a second workpiece (not shown), is configured for the subsequent operation and the torch 10 is moved into proximity for the subsequent operation. The adjustment to the standby arc current, standby gas, and/or standby flow rate decrease the erosive effect of the standby arc on the electrode 14 and the nozzle assembly 12.

Thereafter, the torch 10 can be switched selectively between the working mode and the standby mode as required by the particular operations that are to be performed. When the torch 10 is switched from the standby mode to the working mode, the standby arc is transferred back to the workpiece 100 through the arc-constricting bores 60, 62 to form the working arc extending from the electrode 14 to the workpiece 100. The working arc current is resumed as required by the particular operation, and the flow of the standby gas is substantially terminated and the flow of the plasma gas is resumed. The torch 10 can be started using the pilot mode, as discussed above, and subsequently can be repeatedly switched between the working mode and the standby mode as desired without terminating the arc or starting the arc again from the pilot mode. Thus, the erosive effects on both the nozzle assembly 12 and the electrode 14 can be minimized thereby.

Upon completion of the torch operations, the torch 10 is preferably turned off from the standby mode, but the torch 10 can also be turned off directly from the working mode. To turn the torch 10 off, the arc is terminated and the flow of the standby gas or plasma gas through the nozzle assembly 12 is terminated. If the torch 10 is turned off from the working mode, or if the standby gas is an oxidizing gas, a non-oxidizing gas can be supplied to the passageway 40, and through the coaxial bores 60, 62 of the nozzle assembly 12 between the discharge of the electrode 14 and the nozzle assembly 12.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of operating a plasma arc torch to reduce start erosion of an electrode of the torch, the method comprising:

performing a work operation on a workpiece by operating the torch in a working mode wherein an electric arc is established between the electrode and the workpiece at a working arc current, an oxidizing plasma gas being supplied through a nozzle of the torch at a working flow rate in the working mode; and terminating the work operation and substantially simultaneously switching the torch to a standby mode by reducing the arc current to a standby arc current and causing the arc to extend between the electrode and the nozzle, a non-oxidizing standby gas being supplied through the nozzle in the standby mode at a standby flow rate.

2. A method of operating a plasma arc torch according to claim 1, further comprising starting the torch prior to performing the work operation by:

initiating a pilot arc between the electrode and the nozzle at a pilot arc current less than the working arc current;

initiating a flow of gas through the nozzle at a pilot flow rate less than the working flow rate; and subsequent to said initiating steps, switching the torch to the working mode by increasing the arc current and the gas flow rate and causing the arc to be established between the electrode and the workpiece.

3. A method of operating a plasma arc torch according to claim 1, wherein operating the torch in the working mode comprises operating the torch with a working arc current of at least about 250 amps, and the torch in the standby mode is operated at a standby arc current less than about 25 amps.

4. A method of operating a plasma arc torch according to claim 1, wherein supplying the oxidizing gas in the working mode comprises supplying oxygen, and in the standby mode at least one of the group consisting of nitrogen and argon is supplied to the torch as the standby gas.

5. A method of operating a plasma arc torch according to claim 1, further comprising repeating the step of performing a work operation in the working mode subsequent to said switching step.

6. A method of operating a plasma arc torch to reduce start erosion of an electrode of the torch, the method comprising:

performing a work operation on a workpiece by operating the torch in a working mode wherein an electric arc is established between the electrode and the workpiece at a working arc current, a plasma gas being supplied through a nozzle of the torch at a working flow rate in the working mode; and terminating the work operation and substantially simultaneously switching the torch to a standby mode by reducing the arc current to a standby arc current and causing the arc to extend between the electrode and the nozzle, a standby gas being supplied through the nozzle in the standby mode at a standby flow rate less than the working flow rate.

7. A method of operating a plasma arc torch according to claim 6, further comprising starting the torch prior to performing the work operation by:

initiating a pilot arc between the electrode and the nozzle at a pilot arc current less than the working arc current;

initiating a flow of gas through the nozzle at a pilot flow rate less than the working flow rate; and subsequent to said initiating steps, switching the torch to the working mode by increasing the arc current and the gas flow rate and causing the arc to be established between the electrode and the workpiece.

8. A method of operating a plasma arc torch according to claim 6, wherein operating the torch in the working mode comprises operating the torch with a working arc current of at least about 250 amps, and the torch in the standby mode is operated at a standby arc current less than about 25 amps.

9. A method of operating a plasma arc torch according to claim 6, wherein the torch in the working mode is operated at a working flow rate of plasma gas of at least about 2 CFM and the flow rate is reduced in the standby mode to a standby flow rate less than about 1 CFM.

10. A method of operating a plasma arc torch according to claim 6, wherein the torch in the working mode is operated at a working flow rate of plasma gas of at least about 2 CFM and the flow rate is reduced in the standby mode to a standby flow rate between about 0.25 CFM and 0.60 CFM.

11. A method of operating a plasma arc torch according to claim 6, wherein operating the torch in the working mode comprises supplying an oxidizing plasma gas to the torch, and in the standby mode the oxidizing plasma gas is stopped and a non-oxidizing standby gas is supplied to the torch.

12. A method of operating a plasma arc torch according to claim 11, wherein supplying the oxidizing plasma gas in the working mode comprises supplying oxygen, and in the standby mode at least one of the group consisting of nitrogen and argon is supplied to the torch as the standby gas.

13. A method of operating a plasma arc torch according to claim 6, wherein supplying the standby gas in the standby mode comprises supplying the plasma gas.

14. A method of operating a plasma arc torch according to claim 6, further comprising repeating the step of performing a work operation in the working mode subsequent to said switching step.

15. A method of operating a plasma arc torch to reduce start erosion of an electrode of the torch, the method comprising:

performing a work operation on a workpiece by operating the torch in a working mode wherein an electric arc is established between the electrode and the workpiece at a working arc current, a plasma gas being supplied through a nozzle of the torch at a working flow rate in the working mode; and terminating the work operation and substantially simultaneously switching the torch to a standby mode by reducing the arc current to a standby arc current, causing the arc to extend between the electrode and the nozzle, and adjusting at least one flow parameter of the plasma gas.

16. A method of operating a plasma arc torch according to claim 15, wherein adjusting the at least one flow parameter of the plasma gas comprises at least one of the group consisting of adjusting the flow rate of the plasma gas from the working flow rate to a standby flow rate and supplying a standby gas different than the plasma gas.

17. A method of operating a plasma arc torch according to claim 15, further comprising starting the torch prior to performing the work operation by:

initiating a pilot arc between the electrode and the nozzle at a pilot arc current less than the working arc current;

initiating a flow of gas through the nozzle at a pilot flow rate less than the working flow rate; and subsequent to said initiating steps, switching the torch to the working mode by increasing the arc current and the gas flow rate and causing the arc to be established between the electrode and the workpiece.

18. A method of operating a plasma arc torch according to claim 15, wherein operating the torch in the working mode comprises operating the torch with a working arc current of at least about 250 amps, and the torch in the standby mode is operated at a standby arc current less than about 25 amps.

19. A method of operating a plasma arc torch according to claim 15, further comprising repeating the step of performing a work operation in the working mode subsequent to said switching step.

20. A plasma arc torch configured for selective operation in a working mode and a standby mode to reduce erosion of an electrode, the torch comprising:

a nozzle assembly defining a bore;

an electrode directed toward said bore of said nozzle assembly such that said electrode can be directed toward a workpiece, said electrode being electrically insulated from said nozzle assembly;

a working arc power source in electrical communication with said electrode and the workpiece and configured to supply a working arc current therebetween;

a standby arc power source in electrical communication with said electrode and said nozzle assembly and configured to supply a standby arc current therebetween;

a power controller configured to control and to switch between said working arc power source and said standby arc power source;

a first gas source fluidly connected to said bore of said nozzle, said first gas source providing an oxidizing gas;

a second gas source fluidly connected to said bore of said nozzle, said second gas source providing a non-oxidizing gas; and a gas controller configured to control at least one of a flow of first and second gases from said first and second gas sources, wherein said power controller and said gas controller are configured to switch selectively between a working mode and a standby mode without terminating an arc, the working mode being characterized by said power controller operating said working arc power source to establish an arc between said electrode and the workpiece at the working arc current, and said gas controller operating said first gas source to cause the oxidizing gas to flow through said nozzle at a working flow rate, said standby mode being characterized by said power controller operating said standby arc power source to establish an arc between said electrode and said nozzle at the standby arc current less than the working arc current, and said gas controller operating said second gas source to cause the non-oxidizing gas to flow through said nozzle at a standby flow rate.

21. A plasma arc torch according to claim 20, wherein said working arc power source is configured to supply the working arc current of at least about 250 amps, said standby arc power source is configured to supply the standby current less than about 25 amps, and said power controller is configured to selectively energize and de-energize said working arc power source and said standby arc power source such that the arc is transferred selectively between the workpiece and said nozzle without terminating.

22. A plasma arc torch according to claim 20, wherein said gas controller is configured to variably regulate the flow rates of the gases from said first and second gas sources.

* * * * *